US010689009B2

(12) United States Patent
Rubinstein et al.

(10) Patent No.: US 10,689,009 B2
(45) Date of Patent: Jun. 23, 2020

(54) METHOD, DEVICE AND SYSTEM FOR WARNING ABOUT A WRONG-WAY DRIVE SITUATION FOR A VEHICLE (71) Applicant: Robert Bosch GmbH, Stuttgart (DE)

(72) Inventors: Ilona Rubinstein, Stuttgart (DE); Katharina Erfurth, Weissach (DE); Nadine Walter, Bietigheim-Bissingen (DE); Nuno Ribeiro, Lage (PT); Stefan Meier, Herrenberg (DE); Vera Vilas Boas, V. N. Famalicao (PT); Rafael Nascimento, Braga (PT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/322,576

(22) PCT Filed: Jun. 9, 2017

(86) PCT No.: PCT/EP2017/064181
§ 371 (c)(1),
(2) Date: Feb. 1, 2019

(87) PCT Pub. No.: WO2018/024389
PCT Pub. Date: Feb. 8, 2018

(65) Prior Publication Data
US 2019/0185020 A1 Jun. 20, 2019

(30) Foreign Application Priority Data
Aug. 4, 2016 (DE) .................. 10 2016 214 471

(51) Int. Cl.
*B60W 50/14* (2020.01)
*G08G 1/0962* (2006.01)
(Continued)

(52) U.S. Cl.
CPC .............. *B60W 50/14* (2013.01); *B60K 35/00* (2013.01); *G01C 21/30* (2013.01); *G06F 16/29* (2019.01);
(Continued)

(58) Field of Classification Search
CPC ........ G08G 1/056; G08G 1/162; G08G 1/164; G08G 1/166; G08G 1/0104; G08G 1/01; B60Q 1/50; B60Q 9/008
See application file for complete search history.

(56) References Cited

U.S. PATENT DOCUMENTS

2010/0207787 A1* 8/2010 Catten .............. G08G 1/096716
340/905
2015/0130643 A1 5/2015 Nagy
(Continued)

FOREIGN PATENT DOCUMENTS

DE 102013224824 A1 6/2015

OTHER PUBLICATIONS

International Search Report for PCT/EP2017/064181, dated Sep. 18, 2017.

*Primary Examiner* — Hongmin Fan
(74) *Attorney, Agent, or Firm* — Norton Rose Fulbright US LLP; Gerard Messina (57) ABSTRACT A method for warning about a wrong-way drive situation for a vehicle. The method includes at least reading in a wrong-way drive signal by an interface to a wrong-way drive detection unit. The wrong-way drive signal represents the wrong-way drive situation. The method also includes evaluating the wrong-way drive signal to determine a piece of role information. The piece of role information represents a role of the vehicle with respect to the wrong-way drive situation. The method furthermore includes generating at least one warning signal to warn about the wrong-way drive situation
(Continued)

using the piece of role information. The at least one warning signal represents at least one role-dependent warning message. Moreover, the method includes providing the at least one warning signal at an interface to at least one output unit for outputting the at least one warning signal in the vehicle.

13 Claims, 6 Drawing Sheets

(51) Int. Cl.
| | |
|---|---|
| *G08G 1/056* | (2006.01) |
| *G06K 9/00* | (2006.01) |
| *G08G 1/16* | (2006.01) |
| *B60K 35/00* | (2006.01) |
| *G06F 16/29* | (2019.01) |
| *G01C 21/30* | (2006.01) |

(52) U.S. Cl.
CPC ..... *G06K 9/00818* (2013.01); *G06K 9/00825* (2013.01); *G08G 1/056* (2013.01); *G08G 1/0962* (2013.01); *G08G 1/09623* (2013.01); *G08G 1/166* (2013.01); *B60K 2370/178* (2019.05); *B60K 2370/179* (2019.05); *B60K 2370/186* (2019.05); *B60W 2050/143* (2013.01); *B60W 2520/06* (2013.01); *B60W 2555/60* (2020.02)

(56) References Cited

U.S. PATENT DOCUMENTS

| | | | |
|---|---|---|---|
| 2016/0217687 A1* | 7/2016 | Rous | G08G 1/056 |
| 2016/0217688 A1 | 7/2016 | Jeschke et al. | |
| 2016/0375766 A1* | 12/2016 | Konet | B60K 35/00 |
| | | | 348/148 |
| 2017/0018178 A1* | 1/2017 | Poechmueller | G08G 1/056 |

* cited by examiner

METHOD, DEVICE AND SYSTEM FOR WARNING ABOUT A WRONG-WAY DRIVE SITUATION FOR A VEHICLE

FIELD OF THE INVENTION

The present invention is directed to a device and to a method according to the definition of the species in the independent claims. The present invention also relates to a computer program.

BACKGROUND INFORMATION

Integrated assistance systems may be provided in vehicles, for example, which are able to output a warning about a wrong-way driver. This warning takes place, e.g., with the aid of traffic message channel (TMC) messages, which may be directly output via radio in acoustic form or displayed in written form inside the vehicle. It is also possible to spot roads with do not enter signs, for example with the aid of a Global Positioning System (GPS) of the vehicle and/or a camera, and to warn the driver thereupon about the upcoming wrong-way drive.

SUMMARY OF THE INVENTION

Against this background, the approach described here introduces a method, furthermore a device using this method, and finally a corresponding computer program as recited in the main description herein. The measures listed in the further descriptions herein allow advantageous refinements of and improvements on the device described in the main description.

According to specific embodiments, in particular with a traffic situation involving a wrong-way driver, a role of a considered vehicle in the traffic situation may be taken into consideration in a role-dependent configuration of a wrong-way driver warning message. In other words, in particular, different driver situations or driver roles or vehicle roles may be distinguished and warnings adapted thereto may be output. A role may presently, among other things, be understood to mean, for example, a position or a participation of the vehicle in a wrong-way driver situation. In this way, for example, a role-dependent configuration of a wrong-way driver warning based on configuration, interactions and information architecture may be implemented.

According to specific embodiments, pieces of information adapted to user needs may advantageously be displayed, in particular within the scope of the wrong-way driver warning. For example, role-specific messages may take place quickly and precisely. In particular, a safety of road users may be increased. A wrong-way driver warning to be detected quickly and intuitively may be generated and used for this purpose. Such a wrong-way driver warning adapted to different driver roles and vehicle roles may, in particular, offer protection and prevention appropriate for the situation and, in addition or as an alternative, remedy a wrong-way driver situation.

A method for warning about a wrong-way drive situation for a vehicle is introduced, the method including at least the following steps:

reading in a wrong-way drive signal from an interface to a wrong-way drive detection unit, the wrong-way drive signal representing the wrong-way drive situation;

evaluating the wrong-way drive signal to determine a piece of role information, the piece of role information representing a role of the vehicle with respect to the wrong-way drive situation;

generating at least one warning signal to warn about the wrong-way drive situation using the piece of role information, the at least one warning signal representing at least one role-dependent warning message; and providing the at least one warning signal at an interface to at least one output unit for outputting the at least one warning signal in the vehicle.

This method may be implemented in software or hardware or in a mixed form made up of software and hardware, for example in a device or in a control unit. The wrong-way drive situation may represent a traffic situation in which a vehicle is being moved against a prescribed driving direction. The wrong-way drive situation may exist when a wrong-way driver drives on an expressway. The wrong-way drive detection unit may be an Internet-based unit, a cloud-based unit and, additionally or alternatively, represent a part of a navigation device of the vehicle. It is furthermore also conceivable that the wrong-way drive detection unit is configured to evaluate a TMC signal, or to retrieve the wrong-way drive signal from the Internet via a cell phone or, for example, transmit it to a vehicle-based unit with the aid of Bluetooth. The at least one output unit may be part of a mobile device which may be situatable or situated in the vehicle and may, additionally or alternatively, be fixedly installed in the vehicle.

According to one specific embodiment, a piece of role information may be determined in the step of evaluating, which represents the role of the vehicle as a wrong-way driver, as a road user directly affected by another vehicle driving the wrong way on a shared road or as a road user indirectly affected by another vehicle driving the wrong way on an adjoining road. Such a specific embodiment offers the advantage that it is possible, for example, to reliably generate customized warning signals and provide these for output.

In particular, in the step of generating, at least one first warning signal may be generated if it was determined in the step of evaluating that the role of the vehicle is that of a wrong-way driver. In the step of generating, it is also possible to generate at least one second warning signal if it was determined in the step of evaluating that the role of the vehicle is that of a road user directly affected by another vehicle driving the wrong way on a shared road. In the step of generating, the at least one second warning signal or at least one third warning signal may be generated if it was determined in the step of evaluating that the role of the vehicle is that of a road user indirectly affected by another vehicle driving the wrong way on an adjoining road. In this way, depending on what role the vehicle plays in the wrong-way drive situation, a respective different, individual warning signal adapted to the role may be output.

In the step of generating, it is also possible to generate at least one warning signal which may be output visually and/or acoustically and, in addition or as an alternative, haptically. In the step of providing, the at least one warning signal may be provided at an interface to at least one visual, acoustic and, additionally or alternatively, haptic output unit. In the case of a visual output of the at least one warning signal, text and, additionally or alternatively, at least one graphical representation (such as a pictogram) may be displayed with the aid of at least one visual output unit, using the at least one warning signal. In the case of an acoustic output of the at least one warning signal, a speech output and, additionally or alternatively, a warning sound may be output with the aid of at least one acoustic output unit, using the at least one warning signal. Such a specific embodiment offers the advantage that warnings may, in particular, be displayed and output in the form of pictograms with supplementary text and speech output. For example, pictograms are noticeable quickly and easy to understand.

According to one specific embodiment, the at least one warning signal may be provided in the step of providing until an expiration of a predefinable output time duration and, additionally or alternatively, a reaction of a user in the vehicle to the at least one output warning signal are detected. Such a specific embodiment offers the advantage that the wrong-way drive situation may be reliably prevented or at least be mitigated.

In the step of generating, furthermore at least one warning signal may be generated, which represents at least one role-dependent behavior recommendation for occupants of the vehicle. Such a specific embodiment offers the advantage that, in particular, wrong-way driver warning messages may be output with recommendations for a correct behavior appropriate for the situation of a wrong-way driver, at least one driver affected by the wrong-way driver or the surrounding traffic. In this way, for example, warnings and behavior recommendations adapted to different driver roles may be implemented for the wrong-way driver himself/herself and other drivers in the surroundings.

In the step of providing, the at least one warning signal may be provided to output the at least one behavior recommendation after the at least one warning message when an expiration of a predefinable output time duration and, additionally or alternatively, a reaction of a user in the vehicle to the at least one output warning message are detected. Such a specific embodiment offers the advantage that, initially, the actual warning about the hazard may take place, followed by the behavior recommendations aimed at the respective recipient, whereby a traffic safety may be enhanced.

In the step of providing, it is also possible to provide the at least one warning signal until an implementation of the at least one behavior recommendation is detected using drive data of the vehicle. Such a specific embodiment offers the advantage that protection and safety may be maximized by checking an adherence to predefinable actions.

Moreover, in the step of providing, the at least one warning signal may be provided until a cancellation signal is received. The cancellation signal may represent a cancellation of the wrong-way drive situation. Such a specific embodiment offers the advantage that the warning may be ended as soon as the hazardous situation has ended.

In particular, in the step of reading in, a wrong-way drive signal may be read in which, with respect to the wrong-way drive situation, includes at least one piece of position information, a piece of direction information and, additionally or alternatively, a piece of time information. Such a specific embodiment offers the advantage that the wrong-way drive situation may be reliably and precisely contained locally and, in addition or as an alternative, temporally.

The approach presented here furthermore creates a device which is configured to carry out, activate or implement the steps of one variant of a method described here in corresponding units. The object underlying the present invention may also be achieved quickly and efficiently by this embodiment variant of the present invention in the form of a device.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EEPROM or a magnetic memory unit. The communication interface may be configured to read in or output data wirelessly and/or in a wire-bound manner, a communication interface which is able to read in or output wire-bound data being able to read these data in, for example electrically or optically, from a corresponding data transmission line or output these into a corresponding data transmission line.

A device may presently be understood to mean an electrical device which processes sensor signals and outputs control and/or data signals as a function thereof. The device may include an interface which may be configured as hardware and/or software. In the case of a hardware configuration, the interfaces may, for example, be part of a so-called system ASIC which includes a wide variety of functions of the device. However, it is also possible for the interfaces to be separate integrated circuits, or to be at least partially made up of discrete elements. In the case of a software configuration, the interfaces may be software modules which are present on a microcontroller, for example, in addition to other software modules.

In one advantageous embodiment, the device controls a system for warning about a wrong-way drive situation for a vehicle. For this purpose, the device may, for example, access wrong-way drive signals and, if necessary, sensor signals such as position signals and time signals. The activation of the at least one output unit takes place with the aid of warning signals.

A system for warning about a wrong-way drive situation for a vehicle is also introduced, the system including at least the following features:

one specific embodiment of the above-described device; and at least one output unit for outputting the at least one warning signal in the vehicle, the at least one output unit and the device being connected to one another in a signal transmission-capable manner.

In the system, one specific embodiment of the above-described device may advantageously be used or utilized to carry out or control the warning about a wrong-way drive situation.

According to one specific embodiment, the device and/or the at least one output unit may be part of a mobile device situatable or situated in the vehicle or may be fixedly installed in the vehicle. A display device fixedly installed in the vehicle may also be used as an output unit for a mobile device, for example when the mobile device may be coupled to the display device. A mobile device may include the device and at least one output unit. In this way, a warning function may be met in a manner which is flexibly adaptable to circumstances of a vehicle.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the approach presented here are shown in the drawings and are described in greater detail in the following description.

In the following description of favorable exemplary embodiments of the present invention, identical or similar reference numerals are used for similarly acting elements shown in the different figures, and a repeated description of these elements is dispensed with.

DETAILED DESCRIPTION

Figure 1:
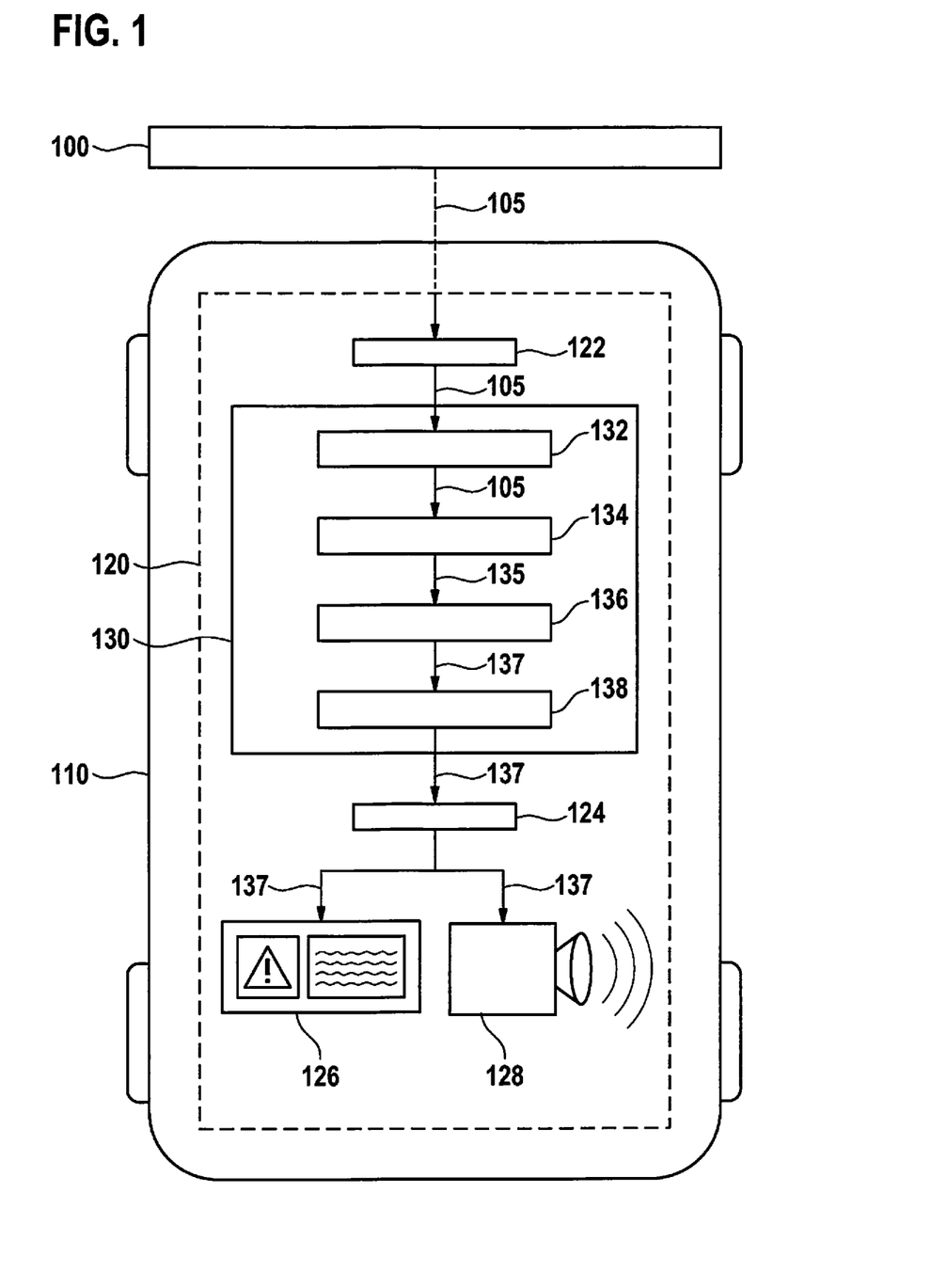
FIG. 1 shows a schematic representation of a system according to one exemplary embodiment in a vehicle.

FIG. 1 shows a schematic representation of a system 120 or a warning system 120 according to one exemplary embodiment in a vehicle 110. Vehicle 110 is configured as a motor vehicle, in particular a road-bound motor vehicle, for example a passenger car, a truck or another commercial vehicle. Warning system 120 is a system for warning about a wrong-way drive situation. The wrong-way drive situation represents a traffic situation in which a vehicle is being moved against a prescribed driving direction, for example. The vehicle driving the wrong way may be vehicle 110 or another vehicle.

Furthermore, a wrong-way drive detection unit 100 is shown. Wrong-way drive detection unit 100 is configured to provide a wrong-way drive signal 105. Wrong-way drive signal 105 represents the wrong-way drive situation. Wrong-way drive detection unit 100 is connected to vehicle 110 in a signal transmission-capable manner. Wrong-way drive detection unit 100 is configured to transmit wrong-way drive signal 105 to vehicle 110 or to provide the signal for transmission thereto. In the exemplary embodiment shown in FIG. 1, wrong-way drive detection unit 100 is situated away from vehicle 110. Wrong-way drive detection unit 100 is executable on the Internet or in the so-called cloud or processor cloud, for example.

Warning system 120 is situated in vehicle 110. According to the exemplary embodiment shown in FIG. 1, warning system 120 includes a first interface 122 or a read-in interface 122, a second interface 124 or an output interface 124, only by way of example a first output unit 126 and a second output unit 128 and a warning device 130 or device 130 for warning about the wrong-way drive situation. Device 130 and output units 126 and 128 are connected to one another in a signal transmission-capable manner. Device 130 includes a read-in unit 132, an evaluation unit 134, a generation unit 136 and a provision unit 138.

Read-in unit 132 of device 130 is configured to read in wrong-way drive signal 105 of wrong-way drive detection unit 100 from first interface 122. In other words, read-in unit 132 is configured to read in wrong-way drive signal 105 from first interface 122 to wrong-way drive detection unit 100. Read-in unit 132 is furthermore configured to forward read-in wrong-way drive signal 105 to evaluation unit 134 or to provide it to evaluation unit 134.

Evaluation unit 134 is configured to evaluate wrong-way drive signal 105 to determine a piece of role information 135. Piece of role information 135 determined with the aid of evaluation unit 134 represents or denotes a role of vehicle 110 with respect to the wrong-way drive situation. Evaluation unit 134 is configured to forward piece of role information 135 to generation unit 136 or to provide it to generation unit 136.

Generation unit 136 is configured to generate at least one warning signal 137 to warn about the wrong-way drive situation, using piece of role information 135. The at least one warning signal 137 generated with the aid of generation unit 136 represents at least one role-dependent warning message. In other words, the at least one warning signal 137 is suitable for effectuating an output of at least one role-dependent warning message. Generation unit 136 is furthermore configured to forward the at least one warning signal 137 to provision unit 138.

Provision unit 138 is configured to provide the at least one warning signal 137 generated with the aid of generation unit 136 at second interface 124 to output units 126 and 128. In other words, provision unit 138 is configured to provide the at least one warning signal 137 via second interface 124 to output units 126 and 128 for output.

The at least one output unit 126 and 128 is, or output units 126 and 128 are, configured to output the at least one warning signal 137 in vehicle 110. According to the exemplary embodiment shown in FIG. 1, first output unit 126 is configured, by way of example, to visually output warning signal 137, and second output unit 128 is configured, by way of example, to acoustically output warning signal 137.

According to one exemplary embodiment, device 130 and output units 126 and 128 are part of a mobile device situatable or situated in vehicle 110. Warning system 120 represents a part of the mobile device. As an alternative, device 130 and output units 126 and 128 or warning system 120, are/is fixedly installed in vehicle 110. According to one other exemplary embodiment, only at least one portion of warning system 120 is configured as part of a mobile device or fixedly installed in vehicle 110.

According to one exemplary embodiment, wrong-way drive signal 105 includes at least one piece of position information, one piece of direction information and/or one piece of time information with respect to the wrong-way drive situation. In particular, generation unit 136 is configured to generate at least one warning signal 137, which may be output visually, acoustically and/or haptically. Provision unit 138 is configured to provide the at least one warning signal 137 at second interface 124 to at least one visual, acoustic and/or haptic output unit 126 and 128. According to one exemplary embodiment, warning system 130 may thus include at least one further output unit, which may be configured to visually, acoustically and/or haptically output the at least one warning signal 137.

Figure 2:
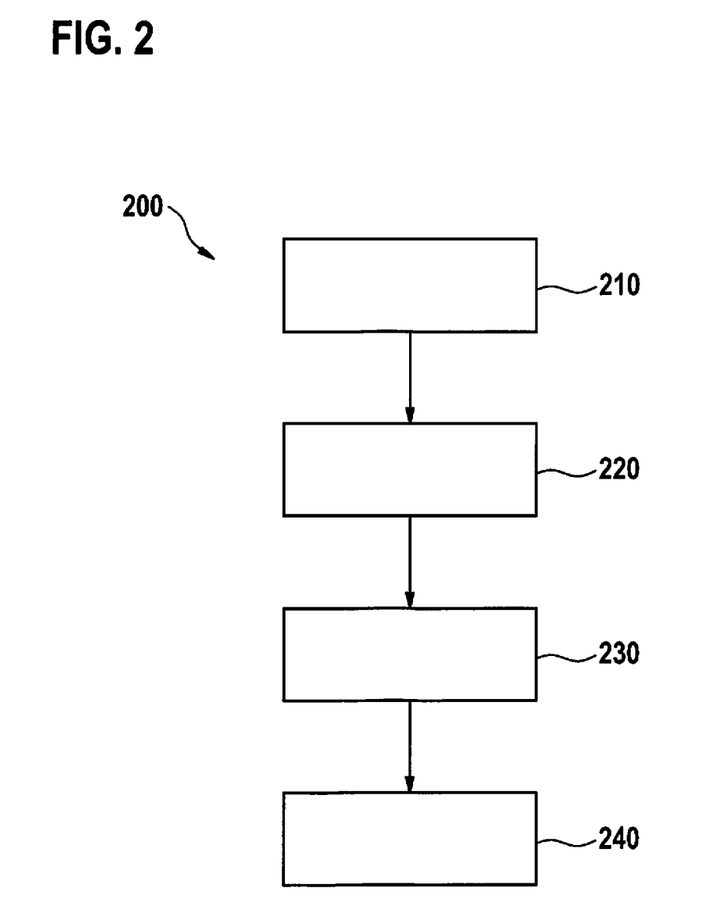
FIG. 2 shows a flow chart of a method for warning according to one exemplary embodiment.

FIG. 2 shows a flow chart of a method 200 for warning according to one exemplary embodiment. Method 200 for warning may be executed to warn about a wrong-way drive situation. Method 200 is executable in connection with a vehicle, such as the vehicle from FIG. 1. Method 200 for warning is executable using the warning system from FIG. 1 or a similar warning system. Method 200 for warning is executable with the aid of the device from FIG. 1 or a similar device.

According to the exemplary embodiment shown in FIG. 2, method 200 includes a step 210 of reading in, a step 220 of evaluating, a step 230 of generating, and a step 240 of providing. In step 210 of reading in, a wrong-way drive signal is read in by an interface to a wrong-way drive detection unit. The wrong-way drive signal represents the wrong-way drive situation. Thereafter, in step 220 of evaluating, the wrong-way drive signal read in in step 210 of reading in is evaluated to determine a piece of role information. The piece of role information represents a role of the vehicle with respect to the wrong-way drive situation. In the subsequently executable step 230 of generating, at least one warning signal for warning about the wrong-way drive situation is generated, using the piece of role information determined in step 220 of evaluating. The at least one warning signal generated in step 230 of generating represents at least one role-dependent warning message. Finally, in step 240 of providing, the at least one warning signal generated in step 230 of generating is provided at an interface to at least one output unit for outputting the at least one warning signal in the vehicle.

For example, in step 220 of evaluating, a piece of role information is determined which represents the role of the vehicle as a wrong-way driver, as a road user directly affected by another vehicle driving the wrong way on a shared road or as a road user indirectly affected by another vehicle driving the wrong way on an adjoining road. According to one exemplary embodiment, in step 230 of generating, at least one first warning signal is generated if it was determined in step 220 of evaluating that the role of the vehicle is that of a wrong-way driver. In step 230 of generating, at least one second warning signal is also generated if it was determined in step 220 of evaluating that the role of the vehicle is that of a road user directly affected by another vehicle driving the wrong way on a shared road. In step 230 of generating, the at least one second warning signal or at least one third warning signal is generated if it was determined in step 220 of evaluating that the role of the vehicle is that of a road user indirectly affected by another vehicle driving the wrong way on an adjoining road.

According to one exemplary embodiment, the at least one warning signal is provided in step 240 of providing until an expiration of a predefinable output time duration and/or a reaction of a user in the vehicle to the at least one output warning signal is/are detected. According to one further exemplary embodiment, in step 240 of providing, the at least one warning signal is provided until a cancellation signal is received. The cancellation signal represents a cancellation of the wrong-way drive situation.

In particular, in step 230 of generating, at least one warning signal is generated which represents at least one role-dependent behavior recommendation for occupants of the vehicle. For example, in step 240 of providing, the at least one warning signal is provided to output the at least one behavior recommendation after the at least one warning message when an expiration of a predefinable output time duration and/or a reaction of a user in the vehicle to the at least one output warning message is/are detected. In step 240 of providing, for example, the at least one warning signal is also provided until an implementation of the at least one behavior recommendation represented by the at least one warning signal is detected using drive data.

Figure 3:
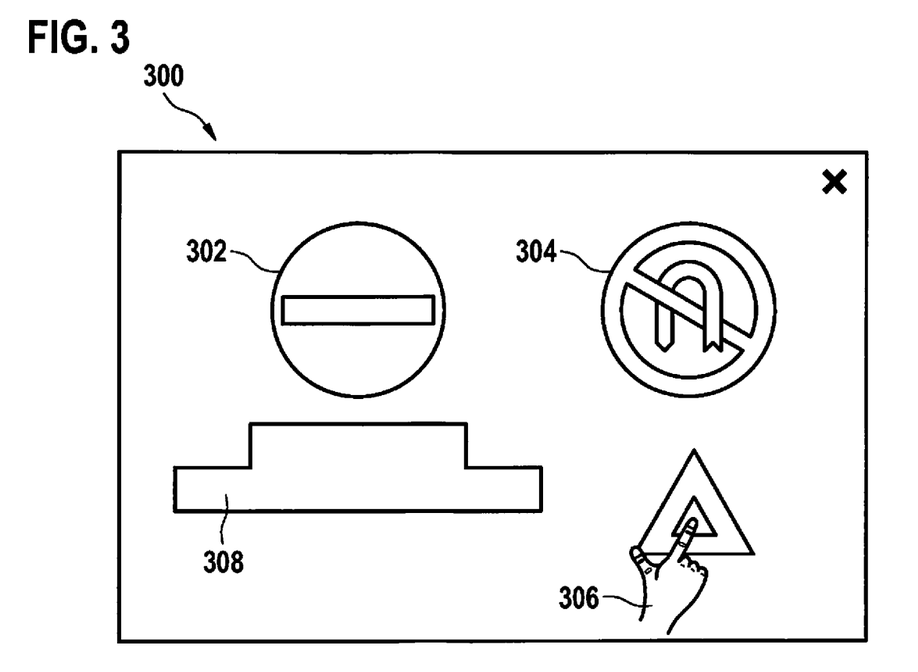
FIG. 3 shows a display of an output unit of a system according to one exemplary embodiment in a vehicle.

FIG. 3 shows a display 300 of an output unit of a system according to one exemplary embodiment in a vehicle. Display 300 is displayable, for example, with the aid of the first output unit of the system from FIG. 1, using the warning signal. The vehicle is the vehicle from FIG. 1, for example. Display 300 represents a role-dependent warning message in the case in which the vehicle is a vehicle driving the wrong way, for example a wrong-way driver.

Display 300 includes three pictograms 302, 304 and 306 and an information text 308 of the warning message only by way of example. A first pictogram 302 represents a do not enter sign, a second pictogram 304 representing a no U-turn sign, and a third pictogram 306 representing a prompt to touch display 300 or the output unit. Information text 308 reads, for example, "Wrong driving direction" and "Stop at nearest shoulder!".

Figure 4:
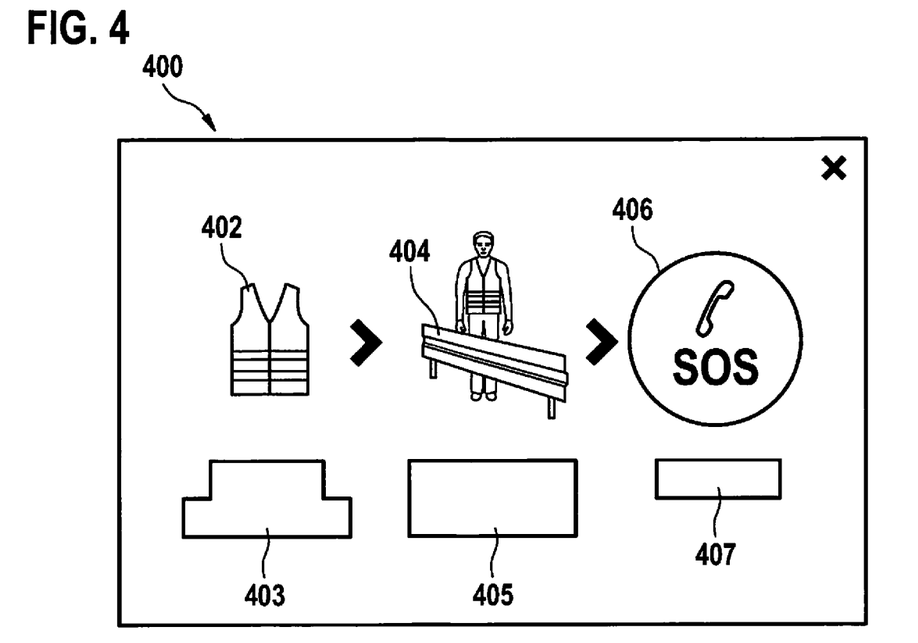
FIG. 4 shows a display of an output unit of a system according to one exemplary embodiment in a vehicle.

FIG. 4 shows a display 400 of an output unit of a system according to one exemplary embodiment in a vehicle. Display 400 corresponds to the display from FIG. 3, with the exception that display 400 represents a continuation of the display from FIG. 3. More precisely, display 400 represents role-dependent behavior recommendations in the case in which the vehicle is the vehicle driving the wrong way.

Display 300 includes three pictograms 402, 404 and 406 and three information texts 403, 405 and 407 of the behavior recommendations only by way of example. A first pictogram 402 represents a reflective vest, a first information text 403 reading "Put on reflective vest", for example. A second pictogram 404 represents a person behind a guard rail, a second information text 405 reading "Step behind guard rail", for example. A third pictogram 406 represents an emergency call, a third information text 407 reading "Call for help", for example.

Figure 5:
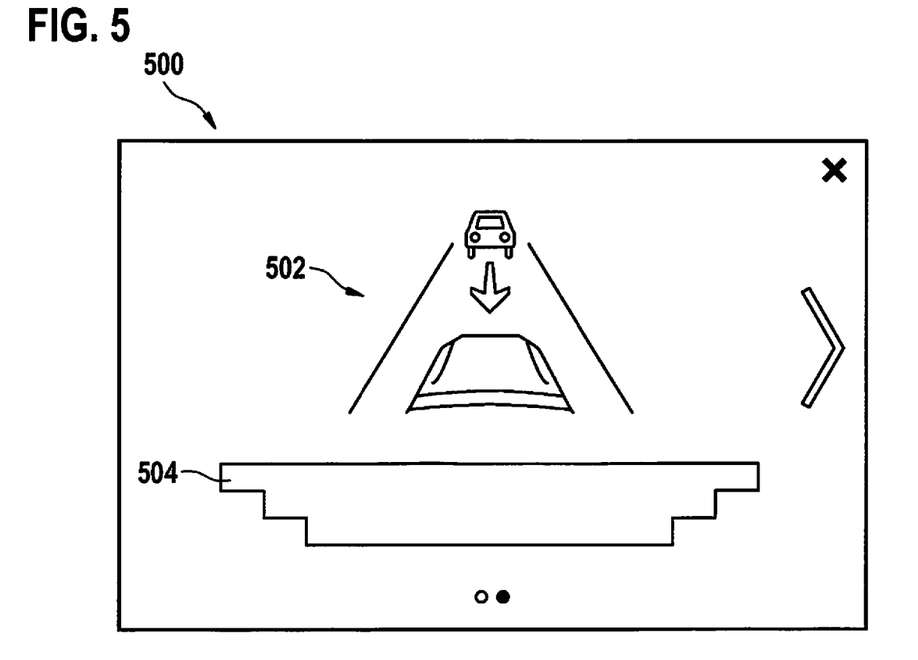
FIG. 5 shows a display of an output unit of a system according to one exemplary embodiment in a vehicle.

FIG. 5 shows a display 500 of an output unit of a system according to one exemplary embodiment in a vehicle. Display 500 corresponds to the display from FIG. 3, with the exception that display 500 represents a role-dependent warning message in the case in which the vehicle driving the wrong way is another vehicle.

Display 500 includes one pictogram 502 and an information text 504 of the warning message only by way of example. Pictogram 502 represents an oncoming wrong-way driver in relation to the vehicle. Information text 504 reads "Caution! Wrong-way driver close by" and "Reported 5 minutes ago", for example.

Figure 6:
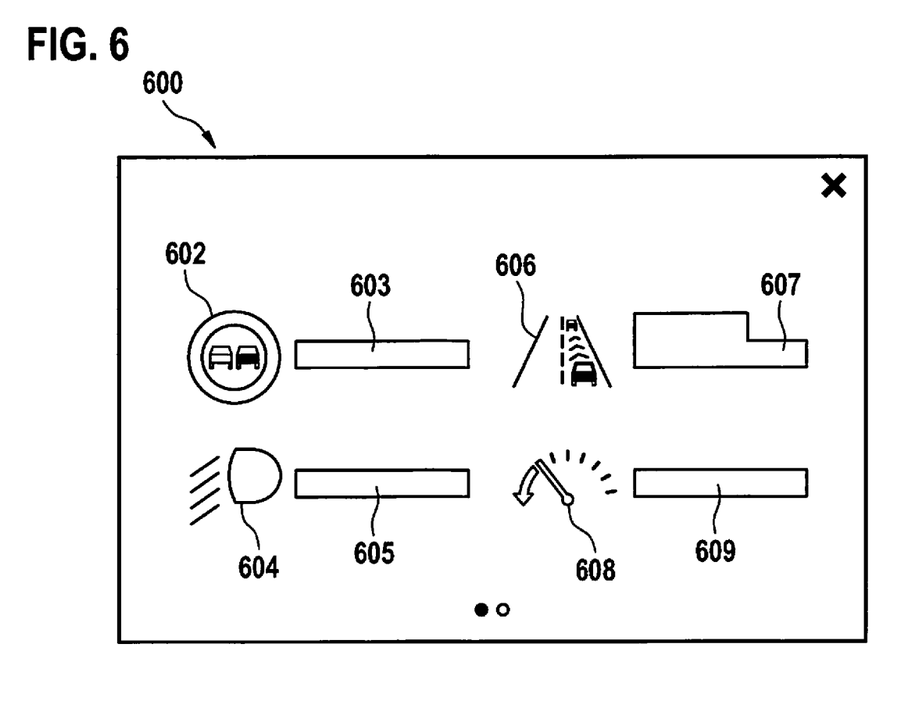
FIG. 6 shows a display of an output unit of a system according to one exemplary embodiment in a vehicle.

FIG. 6 shows a display 600 of an output unit of a system according to one exemplary embodiment in a vehicle. Display 600 corresponds to the display from FIG. 5, with the exception that display 600 represents a continuation of the display from FIG. 5. More precisely, display 600 represents role-dependent behavior recommendations in the case in which the vehicle driving the wrong way is another vehicle.

Display 600 includes four pictograms 602, 604, 606 and 608 and four information texts 603, 605, 607 and 609 of the behavior recommendations only by way of example. A first pictogram 602 represents a no passing sign, a first information text 603 reading "Do not pass", for example. A second pictogram 604 represents a low beam, a second information text 605 reading "Turn on low beam", for example. A third pictogram 606 represents a safety distance between vehicles, a third information text 607 reading "Keep your distance", for example. A fourth pictogram 608 represents a speed indicator, a fourth information text 609 reading "Reduce speed", for example.

Figure 7:
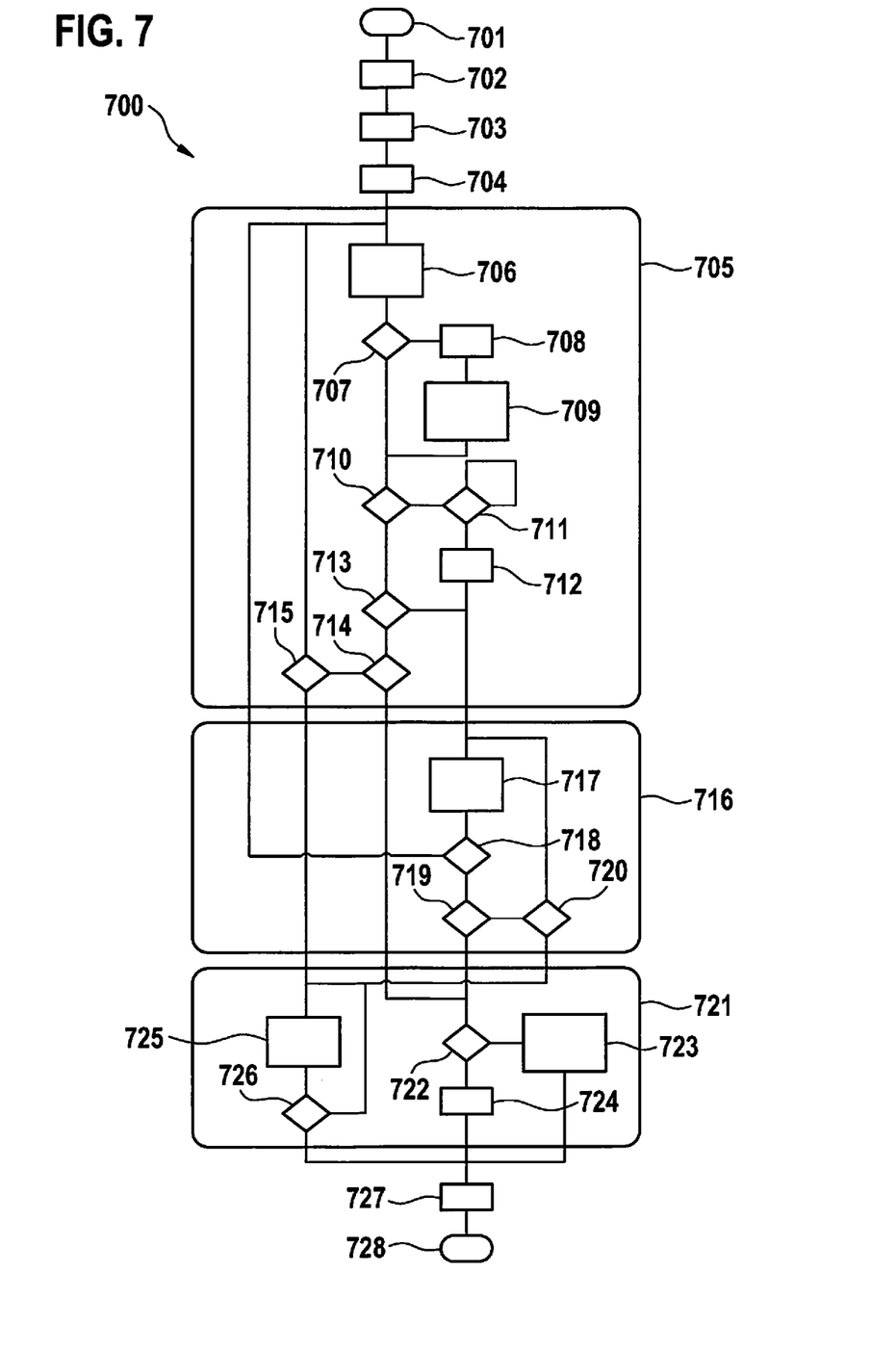
FIG. 7 shows a flow chart of a process for warning according to one exemplary embodiment.

FIG. 7 shows a flow chart of a process 700 for warning according to one exemplary embodiment. Process 700 is related to the method for warning from FIG. 2 or a similar method.

Process 700 for warning is carried out for a vehicle whose role in a wrong-way drive situation is that of a vehicle driving the wrong way. The role of the vehicle may be referred to as a first role.

Process 700 starts with a block 701. Thereafter, a normal execution is established in a block 702. Afterwards, an event occurs in a block 703 in which a driver of the vehicle enters an expressway in the wrong direction. Thereupon, in a block 704, an alarm or a warning for the first role or the role as a wrong-way driver is triggered, for example in a processor cloud or a cloud. The wrong-way drive signal may be transmitted.

Then, process 700 enters a higher-level block 705 in which, among other things, a warning screen or a first screen is displayed. The warning screen corresponds to or resembles the display from FIG. 3. In a block 706, the warning screen is displayed. Then, in a block 707, it is checked whether a sound or an audio output is activated. If this is the case, a warning sound is played in a block 708, for example a beep lasting 1 second. Thereafter, in a block 709, another warning sound is played, for example "You are driving in the wrong direction!Stop at nearest shoulder." The further warning sound may be played repeatedly with a 1 second pause between repetitions. The further warning sound is played completely at least once, even if the screen switches to the second screen or a user pushes a back button at an interface. Thereafter, process 700 transitions to a block 710, which is reached directly after block 707 if the check shows that a sound is deactivated. In block 710, it is checked whether the vehicle is stopping. If this is the case, the process transitions to a block 711, in which it is checked whether the first screen was displayed for at least 30 seconds, for example. If this is not the case, process 700 runs through block 711 in a loop until the condition is met. When the first screen has been displayed for 30 seconds, process 700 transitions to a block 712 in which the warning sound or beep is played, for example with a duration of 1 second, simultaneously with a change of the screen or the display. If the check in block 710 shows that the vehicle is not stopping, process 700 transitions from block 710 to a block 713, in which it is checked whether a user triggered a change of the display, for example by wiping. If this is not the case, process 700 transitions to a block 714, in which it is checked whether the user rejects the warning. If this is not the case, process 700 transitions to a block 715, in which it is detected whether the user pushes the back button. If this is not the case, process 700 jumps back to block 706.

Subsequent to block 712, or if it was established in block 713 that the user triggered the change of the display, process 700 transitions to a higher-level block 716 in which, among other things, a recommendation screen or a recommendation display or a second screen or a second display is shown. Recommendations are shown in a block 717. The recommendations correspond, or the second display corresponds, to the display from FIG. 4 or a similar display. Subsequent to block 717, block 718 follows, in which it is checked whether the user triggered a change to the preceding screen, for example by wiping. If this is the case, process 700 jumps back to block 706. If this is not the case, process 700 transitions from block 718 to a block 719, in which it is checked whether the user rejects the warning. If this is not the case, process 700 transitions to a block 720, in which it is established whether the user pushes the back button. If this is not the case, process 700 jumps back to block 717.

In the course of process 700, a higher-level block 721 now follows, in which a banner display or a third display is displayed, among other things. If it was determined in block 719 that the user rejects the warning, process 700 transitions to a block 722, in which it is established whether the warning is still active. If this is the case, it is displayed in a block 723 that a notification is available in a notification center. If this is not the case, the warning in a notification area is deleted in a block 724. Block 722 is also reached directly from block 714 if it was determined there that the user rejects the warning. If it was determined in block 720 that the user pushes the back button, the process transitions to a block 725, in which a banner including the warning is displayed on a screen. From block 725, process 700 transitions to a block 726, in which it is established whether the warning is still active. If this is the case, process 700 jumps back to block 725. Block 725 is also reached directly from block 715 if it was detected there that the user pushes the back button.

Thereafter, process 700 transitions from block 723 to block 724 or, if it was established in block 726 that the warning is no longer active, to a block 727, in which a normal flow is established. Finally, process 700 ends after block 727 at a block 728.

Figure 8:
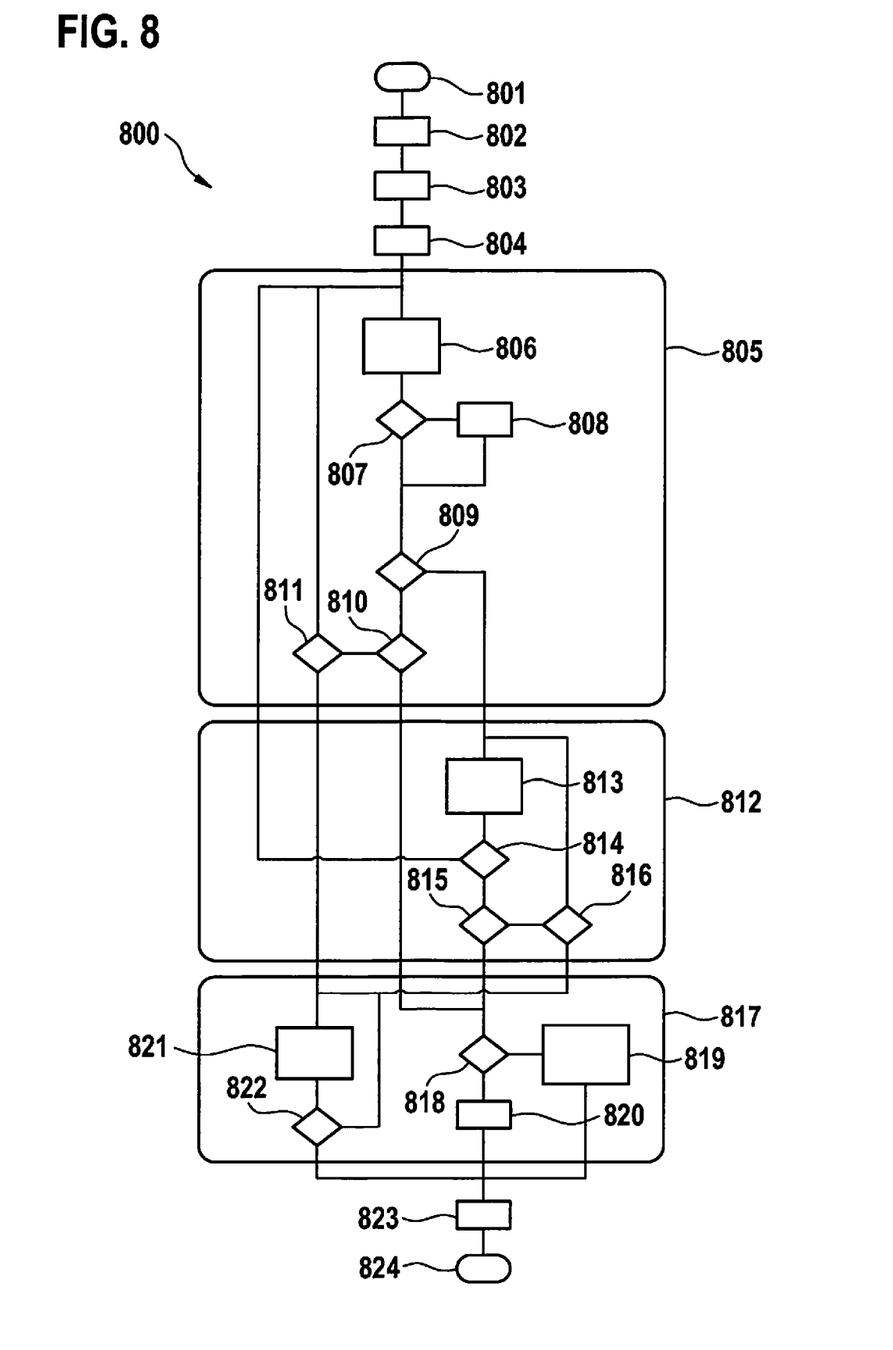
FIG. 8 shows a flow chart of a process for warning according to one exemplary embodiment.

FIG. 8 shows a flow chart of a process 800 for warning according to one exemplary embodiment. Process 800 is related to the method for warning from FIG. 2 or a similar method. Process 800 for warning is carried out for a vehicle whose role in a wrong-way drive situation is that of a vehicle affected by another vehicle driving the wrong way. Process 800 for warning is thus similar to the process from FIG. 7.

Process 800 starts with a block 801. Thereafter, a normal execution is established in a block 802. Afterwards, an event occurs in a block 803 in which a wrong-way driver is detected in the surroundings. Thereupon, in a block 804, an alarm or a warning for the second or third role or the role as a road user affected by a wrong-way driver or a road user potentially affected by a wrong-way driver is triggered, for example in a processor cloud or a cloud. The wrong-way drive signal may be transmitted.

Then, process 800 enters a higher-level block 805 in which, among other things, a warning screen or a first screen is displayed. The warning screen corresponds to or resembles the display from FIG. 5. In a block 806, the warning screen is displayed. Then, in a block 807, it is checked whether a sound or an audio output is activated. If this is the case, a warning sound is played in a block 808, for example a beep lasting 1 second, in particular simultaneously with a change of the display. Thereafter, process 800 transitions to a block 809, which is also reached from block 807 if the check shows that a sound is deactivated. In block 809, it is established whether a user triggered a change of the display, for example by wiping. If this is not the case, process 800 transitions to a block 810, in which it is checked whether the user rejects the warning. If this is not the case, process 800 transitions to a block 811, in which it is detected whether the user pushes the back button. If this is not the case, process 800 jumps back to block 806.

If it was established in block 809 that the user triggered the change of the display, process 800 transitions to a higher-level block 812 in which, among other things, a recommendation screen or a recommendation display or a second screen or a second display is shown. Recommendations are shown in a block 813. The recommendations correspond, or the second display corresponds, to the display from FIG. 6 or a similar display. Subsequent to block 813, a block 814 follows, in which it is checked whether the user triggered a change to the preceding screen, for example by wiping. If this is the case, process 800 jumps back to block 806. If this is not the case, process 800 transitions from block 814 to a block 815, in which it is checked whether the user rejects the warning. If this is not the case, process 800 transitions to a block 816, in which it is established whether the user pushes the back button. If this is not the case, process 800 jumps back to block 813.

In the course of process 800, a higher-level block 817 now follows, in which a banner display or a third display is displayed, among other things. If it was determined in block 815 that the user rejects the warning, process 800 transitions to a block 818, in which it is established whether the warning is still active. If this is the case, it is displayed in a block 819 that a notification is available in a notification center. If this is not the case, the warning in a notification area is deleted in a block 820. Block 818 is also reached directly from block 810 if it was determined there that the user rejects the warning. If it was determined in block 816 that the user pushes the back button, process 800 transitions to a block 821, in which a banner including the warning is displayed on a screen. From block 821, process 800 transitions to a block 822, in which it is established whether the warning is still active. If this is the case, process 800 jumps back to block 821. Block 821 is also reached directly from block 811 if it was determined there that the user pushes the back button.

Thereafter, process 800 transitions from block 819 to block 820 or, if it was established in block 822 that the warning is no longer active, to a block 823, in which a normal flow is established. Finally, process 800 ends after block 823 at a block 824.

Background information and exemplary embodiments as well as advantages are summarized again hereafter and/or explained in different words with reference to FIGS. 1 through 8.

In particular, a distinction is made between three different roles which a vehicle 110 or a driver may assume. Role 1: Vehicle 110 or the driver thereof becomes the wrong-way driver. When a driver is identified as a wrong-way driver, he or she receives a warning and first behavior recommendations from warning system 120 or method 200, which may be adapted after vehicle 110 has stopped, so that the driver is being assisted until he or she is no longer in the hazardous situation. It is also possible to send a warning message to surrounding road users. Role 2: Vehicle 110 is situated on the same road as a wrong-way driver; there is a collision risk. The driver receives the warning about a wrong-way driver on his or her route from warning system 120 or method 200 and may request to have further behavior recommendations displayed. Role 3: The vehicle travels on a road situated in the vicinity of a wrong-way driver; this may be the opposite traffic lane or another road, for example. There is no collision risk yet. The driver receives an indication of the wrong-way driver and the road to avoid from warning system 120 or method 200, since he or she otherwise runs the risk of colliding with the wrong-way driver.

Recommendations given to the driver of the respective role stem, in particular, from official sources, such as the Department of Transportation. For the first role, the warning message has top priority, thereafter the recommendations are displayed. A voice message may additionally assist the driver. The warning message also has top priority for the second role, and thereafter additional pieces of information are shown and optional recommendations are provided. For the third role, the driver receives pieces of information about a wrong-way driver on another road segment situated nearby. Optionally, recommendations are provided.

According to exemplary embodiments, a logic may consequently be provided, which enables a fast and precise warning and behavior recommendation. As a result of a fast warning and behavior recommendations, a number of accidents caused by wrong-way drives may be reduced, and wrong-way drivers as well as all drivers in the surroundings who are also warned may be assisted.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for warning about a wrong-way drive situation for a vehicle, the method comprising:
    reading in a wrong-way drive signal by a first interface to a wrong-way drive detection unit, the wrong-way drive signal representing the wrong-way drive situation;
    evaluating the wrong-way drive signal to determine a piece of role information, the piece of role information representing a role of the vehicle with respect to the wrong-way drive situation;
    generating at least one warning signal to warn about the wrong-way drive situation using the piece of role information, the at least one warning signal representing at least one role-dependent warning message; and
    providing the at least one warning signal to a second interface to at least one output unit for outputting the at least one warning signal in the vehicle,
    wherein, in the generating, at least one warning signal is generated which represents at least one role-dependent behavior recommendation for occupants of the vehicle, and
    wherein, in the providing, the at least one warning signal is provided to output the at least one behavior recommendation after the at least one warning message when an expiration of a predefinable output time duration and/or a reaction of a user in the vehicle to the at least one output warning message is detected.

2. The method of claim 1, wherein a piece of role information is determined in the evaluating which represents the role of the vehicle as a wrong-way driver, as a road user directly affected by another vehicle driving the wrong way on a shared road or as a road user indirectly affected by another vehicle driving the wrong way on an adjoining road.

3. The method of claim 1, wherein, in the generating, at least one first warning signal is generated if it was determined in the evaluating that the role of the vehicle is that of a wrong-way driver, at least one second warning signal being generated in the generating if it was determined in the evaluating that the role of the vehicle is that of a road user directly affected by another vehicle driving the wrong way on a shared road, and the at least one second warning signal or at least one third warning signal being generated in the generating if it was determined in the evaluating that the role of the vehicle is that of a road user indirectly affected by another vehicle driving the wrong way on an adjoining road.

4. The method of claim 1, wherein the at least one output unit includes at least one visual, acoustic and/or haptic output unit, and wherein, in the generating, at least one warning signal is generated which is outputtable visually, acoustically and/or haptically, in the providing, the at least one warning signal being provided to the second interface to the at least one visual, acoustic and/or haptic output unit.

5. The method of claim 1, wherein, in the providing, the at least one warning signal is provided until an expiration of a predefinable output time duration and/or a reaction of a user in the vehicle to the at least one output warning signal is detected.

6. The method of claim 1, wherein, in the providing, the at least one warning signal is provided until an implementation of the at least one behavior recommendation is detected using drive data of the vehicle.

7. The method of claim 1, wherein, in the providing, the at least one warning signal is provided until a cancellation signal is received, the cancellation signal representing a cancellation of the wrong-way drive situation.

8. The method of claim 1, wherein, in the reading in, a wrong-way drive signal is read in which, with respect to the wrong-way drive situation, includes at least one piece of position information, one piece of direction information and/or one piece of time information.

9. A device for warning about a wrong-way drive situation for a vehicle, comprising:
   a warning device configured to perform the following:
   reading in a wrong-way drive signal by a first interface to a wrong-way drive detection unit, the wrong-way drive signal representing the wrong-way drive situation;
   evaluating the wrong-way drive signal to determine a piece of role information, the piece of role information representing a role of the vehicle with respect to the wrong-way drive situation;
   generating at least one warning signal to warn about the wrong-way drive situation using the piece of role information, the at least one warning signal representing at least one role-dependent warning message; and
   providing the at least one warning signal to a second interface to at least one output unit for outputting the at least one warning signal in the vehicle,
   wherein, in the generating, at least one warning signal is generated which represents at least one role-dependent behavior recommendation for occupants of the vehicle, and
   wherein, in the providing, the at least one warning signal is provided to output the at least one behavior recommendation after the at least one warning message when an expiration of a predefinable output time duration and/or a reaction of a user in the vehicle to the at least one output warning message is detected.

10. A system for warning about a wrong-way drive situation for a vehicle, comprising:
   a device configured to perform the following:
   reading in a wrong-way drive signal by a first interface to a wrong-way drive detection unit, the wrong-way drive signal representing the wrong-way drive situation;
   evaluating the wrong-way drive signal to determine a piece of role information, the piece of role information representing a role of the vehicle with respect to the wrong-way drive situation;
   generating at least one warning signal to warn about the wrong-way drive situation using the piece of role information, the at least one warning signal representing at least one role-dependent warning message; and
   providing the at least one warning signal to a second interface to at least one output unit for outputting the at least one warning signal in the vehicle,
   wherein, in the generating, at least one warning signal is generated which represents at least one role-dependent behavior recommendation for occupants of the vehicle, and
   wherein, in the providing, the at least one warning signal is provided to output the at least one behavior recommendation after the at least one warning message when an expiration of a predefinable output time duration and/or a reaction of a user in the vehicle to the at least one output warning message is detected; and
   at least one output unit for outputting the at least one warning signal in the vehicle, the at least one output unit and the device being connected to one another in a signal transmission-capable manner.

11. The system of claim 10, wherein the device and/or the at least one output unit is part of a mobile device situatable or situated in the vehicle or fixedly installed in the vehicle.

12. A non-transitory computer readable medium having a computer program, which is executable by a processor, comprising:
   a program code arrangement having program code for warning about a wrong-way drive situation for a vehicle, by performing the following:
   reading in a wrong-way drive signal by a first interface to a wrong-way drive detection unit, the wrong-way drive signal representing the wrong-way drive situation;
   evaluating the wrong-way drive signal to determine a piece of role information, the piece of role information representing a role of the vehicle with respect to the wrong-way drive situation;
   generating at least one warning signal to warn about the wrong-way drive situation using the piece of role information, the at least one warning signal representing at least one role-dependent warning message; and
   providing the at least one warning signal to a second interface to at least one output unit for outputting the at least one warning signal in the vehicle;
   wherein, in the generating, at least one warning signal is generated which represents at least one role-dependent behavior recommendation for occupants of the vehicle, and
   wherein, in the providing, the at least one warning signal is provided to output the at least one behavior recommendation after the at least one warning message when an expiration of a predefinable output time duration and/or a reaction of a user in the vehicle to the at least one output warning message is detected.

13. The computer readable medium of claim 12, wherein a piece of role information is determined in the evaluating which represents the role of the vehicle as a wrong-way driver, as a road user directly affected by another vehicle driving the wrong way on a shared road or as a road user indirectly affected by another vehicle driving the wrong way on an adjoining road.

* * * * *